(12) United States Patent
Jain et al.

(10) Patent No.: US 10,108,456 B2
(45) Date of Patent: Oct. 23, 2018

(54) ACCELERATED ATOMIC RESOURCE ALLOCATION ON A MULTIPROCESSOR PLATFORM

(71) Applicant: Western Digital Technologies, Inc., San Jose, CA (US)

(72) Inventors: Harsh Jain, Tustin, CA (US); Abdulnour Toukmaji, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 259 days.

(21) Appl. No.: 15/014,007

(22) Filed: Feb. 2, 2016

(65) Prior Publication Data

US 2017/0220390 A1    Aug. 3, 2017

(51) Int. Cl.
G06F 9/46      (2006.01)
G06F 9/50      (2006.01)

(52) U.S. Cl.
CPC .................................. G06F 9/5027 (2013.01)

(58) Field of Classification Search
None
See application file for complete search history.

(56) References Cited

U.S. PATENT DOCUMENTS

| | | | | |
|---|---|---|---|---|
| 6,009,275 A | * | 12/1999 | DeKoning | G06F 9/5011 710/113 |
| 6,473,849 B1 | | 10/2002 | Keller et al. | |
| 6,745,246 B1 | * | 6/2004 | Erimli | H04L 47/15 370/395.21 |
| 6,823,472 B1 | | 11/2004 | DeKoning et al. | |
| 7,062,583 B2 | | 6/2006 | Kolinummi et al. | |
| 7,594,229 B2 | | 9/2009 | Hirschsohn | |
| 7,743,191 B1 | | 6/2010 | Liao | |

(Continued)

FOREIGN PATENT DOCUMENTS

CN    100468342    3/2009

OTHER PUBLICATIONS

Dale Parson, "Real-time Resource Allocators in Network Processors using FIFOs." Agere Systems, (downloaded from http://www.ece.northwestern.edu/EXTERNAL/anchor/ANCHOR04/final-manuscripts/paper-7.pdf), Jun. 19, 2004, (9 pages).

*Primary Examiner* — Diem Cao
*Assistant Examiner* — Steven Do
(74) *Attorney, Agent, or Firm* — Patterson & Sheridan, LLP; Steven Versteeg

(57) ABSTRACT

A method, system, and apparatus are provided for accelerated atomic resource allocation on a multiprocessor platform. In particular, a resource allocation engine (RAE) performs the following: counting available units for each of the one or more resources; parsing a multi-resource ticket (MRT) for a processor, wherein the parsing identifies one or more requested resource types, each resource type being paired with a requested resource units; comparing the multi-resource ticket to one or more resource queues for the requested resource types, wherein the comparing determines an availability status of at least one the requested resource types; and based on the availability status, calculating whether or not all of the requested resource types can be allocated for the processor, wherein the calculating is completed before allocating a next requested resource for a next processor.

17 Claims, 12 Drawing Sheets

(56) References Cited

U.S. PATENT DOCUMENTS

| | | | |
|---|---|---|---|
| 8,918,791 B1 | 12/2014 | Chudgar et al. | |
| 9,436,391 B1 * | 9/2016 | Lewis | G06F 3/0613 |
| 2003/0069916 A1 * | 4/2003 | Hirschsohn | G06F 9/5016 718/104 |
| 2008/0273455 A1 * | 11/2008 | Green | H04L 1/1877 370/218 |
| 2016/0135171 A1 * | 5/2016 | Korhonen | H04W 4/005 370/329 |

* cited by examiner

ACCELERATED ATOMIC RESOURCE ALLOCATION ON A MULTIPROCESSOR PLATFORM

FIELD

The embodiments of the invention relate generally to accelerated atomic resource allocation on a multiprocessor platform.

BACKGROUND

Embedded systems are getting more complicated with more multiprocessors employed to solve complex problems. Solid-state drive (SSD) controllers have also been following this trend. Such environments typically have limited computer resources with S/W running on these processors competing for them. The limited computer resources that may be shared include main memory, cache memory, logical units (LUNs) of storage capacity such as may be provided by magnetic disk drives, solid state drives, and flash memory, and the files or records stored therein (e.g., a database), various types of input/output (I/O) ports or interfaces, and controllers or engines (e.g., direct memory access engine).

Allocation of global common resources in a multiple central processing unit (multi-CPU) environment is very challenging. Generally software solutions are employed that make use of mutual exclusion object (mutex) protections over resource pools to ensure that each resource pool is tracked and managed by only one central processing unit (CPU) at a time. In computer programming, a mutex is a program object that allows multiple program threads to share the same resource, such as file access, but not simultaneously. When a program is started, a mutex is created with a unique name. After this stage, any program instruction thread that needs to use the shared computer resource locks the mutex from being used by other instruction threads while it is using the computer resource. The mutex is set to unlock when the computer resource is no longer needed or the program routine is finished.

Unfortunately, tracking mutex availability of multiple computer resources available to multiple CPUs wastes valuable CPU bandwidth, typically measured in million instructions per second (MIPS). Further, resource allocation solutions struggle to ensure fairness in allocation of the same computer resource to multiple CPUs. For example, assume that CPU-X and CPU-Y (in that order) are trying to allocate for future use a computer resource that is currently not available. When the computer resource becomes available, it is challenging to ensure that CPU-X is not starved for the resource, that CPU-X gets access to the resource before CPU-Y.

Another aspect of the computer resource problem is resource allocation deadlocks. A resource allocation deadlock occurs when multiple CPUs need access to the same resource at the same time; the system cannot resolve the conflict; and the system becomes deadlocked (e.g., stalled or stuck) on use of the resource. Furthermore, if multiple types of computer resources are required for accomplishing a task, each type of computer resource (resource type) needs to be allocated individually. Accordingly, the complexity of resource allocation increases if the subsequent resource type is not available. Thus, there is a high potential of deadlocks if multiple resource allocation is not done in an atomic fashion.

For example, assume there are 3 different resource types in the system, R1, R2 and R3. Each resource type has only one resource each. CPU-X needs one of each of the resource types R1, R2, R3. CPU-Y needs one of each of resources R3 and R2. CPUs allocate resources as needed simultaneously as follows: (a) CPU-X is able to allocate one each of R1 and R2, but it failed to allocate one of R3 (it just happened to be taken by CPU-Y); (b) CPU-Y is able to allocate one of R3, but failed to allocate one of R2 (taken by CPU-X). This situation leads to a deadlock. CPU-X is holding R2 and waiting for R3. Whereas, CPU-Y is holding R3 and waiting for R2.

Conventional software solutions to resolve such resource allocation deadlocks leave a lot to be desired. In one solution, software running on all CPUs must ensure that different resource types are allocated in a fixed specific order (e.g., first R1, then R2, then R3, and so on). Any CPU requiring R3 and R2 must allocate R2 first and then R3. This solution is complex to manage in a multi-CPU environment requiring multiple resources.

In another solution, if a CPU requires multiple resource types, if it is successful in allocating a few resources but fails to allocate one, then the CPU should give back (e.g., release) all the resources allocated and try again later. This solution wastes lots of CPU MIPS to allocate and free resources every time the CPU fails to allocate one of the many resources needed. For example, imagine when each resource allocation requires taking a mutex. Additionally, this solution also adds to software complexity and size.

In yet another solution, software can be structured such that at any given time, only one global (commonly shared) resource allocation is required. Allocating multiple resource types at any given time is NOT permitted. Unfortunately, this solution adds a huge requirement on software design.

In sum, allocation of global common resources in a multiple central processor unit (multi-CPU) environment is very challenging. Conventional software solutions employed for such scenarios have run into many problems, such as deadlocks, software complexity, wastage of CPU bandwidth (e.g., MIPS), etc.

BRIEF SUMMARY

The present technology provides for accelerated atomic resource allocation on a multiprocessor (e.g., multi-central processing unit, multi-CPU) platform. The embodiments are summarized by the claims that follow below.

BRIEF DESCRIPTIONS OF THE DRAWINGS

Various embodiments are illustrated by way of example, and not by way of limitation, in the figures of the accompanying drawings, in which.

It will be recognized that some or all of the figures are for purposes of illustration and do not necessarily depict the actual relative sizes or locations of the units shown. The figures are provided for the purpose of illustrating one or more embodiments with the explicit understanding that they will not be used to limit the scope or the meaning of the claims.

DETAILED DESCRIPTION

In the following detailed description of the embodiments, numerous specific details are set forth. However, it will be obvious to one skilled in the art that the embodiments may be practiced without these specific details. In other instances well known procedures and components have not been described in detail so as not to unnecessarily obscure aspects of the embodiments.

General Overview

Systems, methods, and devices are described for accelerated atomic resource allocation on a multiprocessor platform. Embedded systems containing multiple processors often employ multiple resources simultaneously. As an example, for solid-state device (SSD) controllers, central processing units (CPUs) may need to share computer resources. Examples of shared computer resources include, without limitation, global external memory (e.g., double data rate synchronous dynamic random-access memory (DDR SDRAM)), on-chip synchronous random access memory (SRAM), hardware queues for signaling, a serial port, and/or a direct memory access (DMA) engine.

This need for sharing generally makes embedded systems, and SSD controllers with multiple processors, prime candidates for using atomic resource allocation. Atomic resource allocation is the ability to allocate all required resources (based on type and count of resource) at substantially the same time.

The present technology can perform atomic resource allocation by using a singular entity, referred to as a resource allocation engine (RAE). The RAE uses transaction based atomic allocation and release of global common resources.

The RAE has several advantages. The RAE eliminates resource allocation deadlocks. The RAE eliminates the need for different mutual exclusion object (mutex) protections for each resource type. The RAE offloads resource allocation and frees tasks from CPUs so that CPUs do not spin cycles to check on the availability of resources. The RAE autonomously ensures fairness in allocating resources at a single location (e.g., at the RAE). The RAE reduces software complexity of the system.

System Overview

Figure 1:
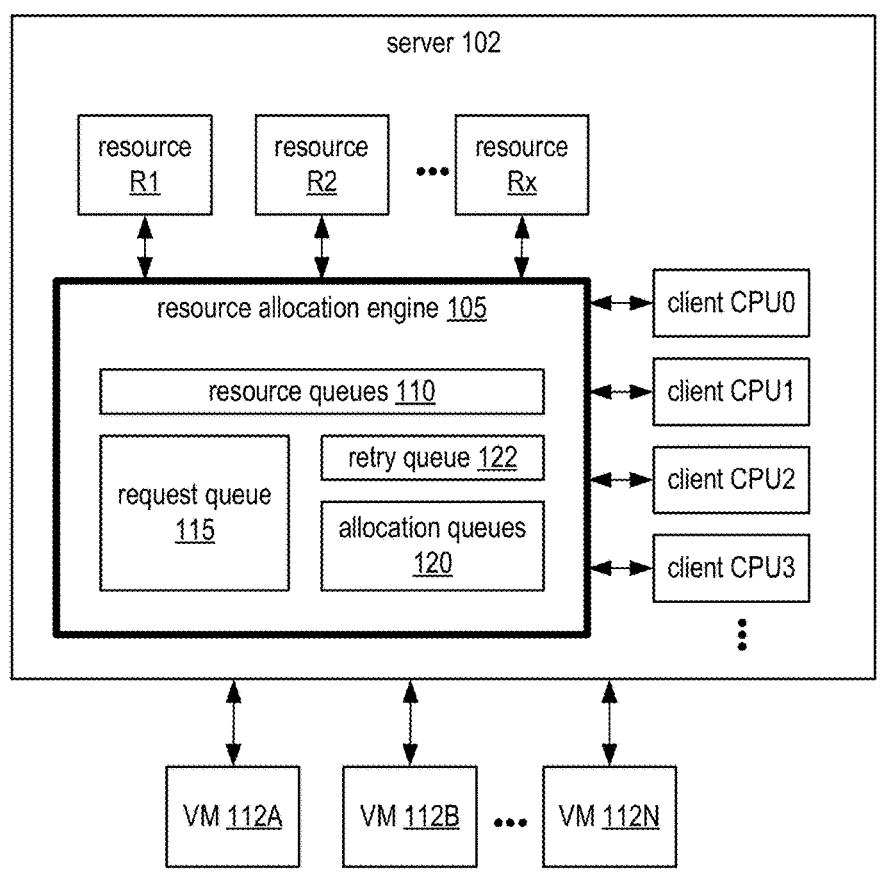
FIG. 1 is a conceptual block diagram of an example data center that can perform atomic resource allocation in a singular entity.

FIG. 1 is a conceptual block diagram of an example data center 100 that can perform atomic resource allocation in a singular entity. The data center 100 includes, without limitation, a server 102 that includes multiple client CPUs, including client CPU0 through client CPU3, and so on. The server 102 includes, without limitation, an RAE 105 that is coupled to one or more shareable computer resources R1 through RX.

For example, resource R1 may include global external memory (e.g., double data rate synchronous dynamic random-access memory (DDR SDRAM)). Resource R2 may include on-chip synchronous random access memory (SRAM). Resource R3 may include a hardware queue for signaling. Resource R4 may include a serial port. Resource R5 may include a direct memory access (DMA) engine. Resource R6 may be one or more shared logical units of storage capacity. Resource R7 may be a shared cache memory, and so on.

FIG. 1 shows the computer resources R1-RX as being included in the server 102. However, the present technology is not so limited. In another embodiment, one or more resources may be external to the server 102. For example, data storage, (one or more shared logical units of storage capacity external to the server 102), may be a shareable resource that is located outside of the server 102.

The server 102 may execute as a host with one or more virtual machines (VMs) 112A-112N. A virtual machine includes a self-contained operating environment that behaves as if it is a separate computer from the host. For example, Java applets run in a VM that has no access to the host server operating system.

The RAE 105 includes, without limitation, resource queues 110, a request queue 115, a retry queue 122, and allocation queues 120. The RAE 105 can be implemented in hardware for improved performance. However, in another embodiment, the RAE may be implemented in software, or in a combination of software and hardware. In one implementation, the components (e.g., resource queues 110, a request queue 115, a retry queue 122, and allocation queues 120) are implemented in a processor device (e.g., application specific integrated circuit (ASIC)) having a microprocessor or controller, memory blocks such as read-only memory (ROM), random access memory (RAM), electrical erasable programmable read-only memory (EEPROM), flash memory, and/or other computer devices. A device is hardware, software, or a combination of hardware and software.

Figure 2:
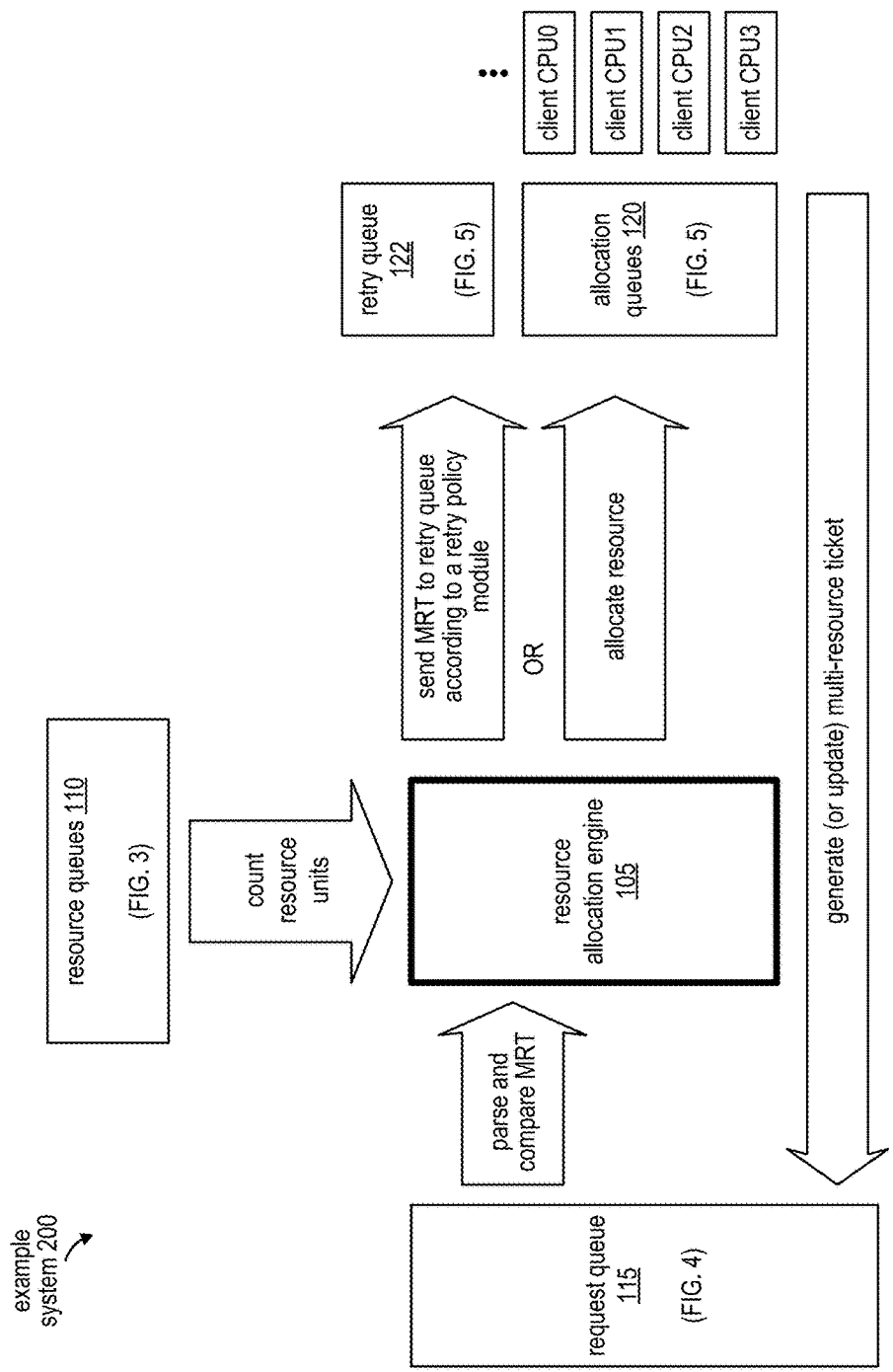
FIG. 2 is a conceptual block diagram of a system for performing atomic resource allocation.

Referring now to FIG. 2, a high-level block diagram of a system 200 for performing atomic resource allocation is shown. The system includes, without limitation, the RAE 105. For explaining functionality, the queues 110, 115, 120, and 122 are shown outside the RAE 105, but may be a physical part of the RAE 105 as discussed above with reference to FIG. 1. In one embodiment, the queues 110, 115, 120, and 122 are first-in-first-out (FIFO) queues. The FIFO queues may be implemented in hardware, software, or a combination of hardware and software. Implementing the FIFO queues in hardware is likely to improve performance.

In FIG. 2, the RAE 105 populates the resource queues 110 with an accounting of the total resources (R1-RX) in the system 200. Accordingly, the RAE 105 receives an accounting of the available computer resources and resource types from the resource queues 110. The RAE 105 populates a FIFO queue for each resource type of computer resource. The resource queues 110 are further discussed with reference to FIG. 3.

In FIG. 2, each client CPU (e.g., CPU0, CPU1, etc.) generates one or more multi-resource tickets (MRTs) indicating a demand, desire, or request for one or more types of computer resources. The MRTs are received by the request queue 115. An entry in the request queue 115 serves as a notification to the RAE 105 that a client CPU has requested use of one or more specific types of computer resources and the quantities of each computer resource. An MRT is a data structure that includes, among other things, the type(s) of resources and quantity (e.g., units) of each resource that the CPU has requested. Each client CPU is informed how to generate and update an MRT by using a software driver that the RAE 105 or the a client has loaded onto each client CPU. For simplicity, further details about MRT fields are not included in this high-level description of FIG. 2, but are described below with reference to FIG. 4.

In FIG. 2, the RAE 105 parses each MRT and compares the contents of each MRT to the status (e.g., count of available units) of the requested resources. The status of each resource is maintained by the resource queues 110. For example, the count of units for a resource type serves as status for the resource type. Once comparisons succeed for all requested resources, the RAE 105 pulls individual units (as indicated by the MRT request) of resource pointers from the respective resource queues 110 and puts the resource pointers in the MRT. The RAE 105 puts this successfully allocated MRT on the requested allocation queue (specified inside the MRT) for the requesting client CPU. Alternatively, the comparison operations can fail, at which point the RAE 105 pushes the MRT into the retry queue 122 for later processing. The RAE 105 handles fail operations according to a retry policy module in the RAE 105. For simplicity, further details about resource allocation are not included in this high-level description of FIG. 2, but are described below with reference to FIG. 4.

Accordingly, based on the comparisons, the RAE 105 either allocates the requested resource in one of the allocation queues 120 or sends an MRT to the retry queue 122. An entry in an allocation queue 120 serves as a notification to a client CPU that a requested resource is available for use by the client CPU. An entry in a retry queue 122 can serve as a notification to a client CPU that a requested resource is presently unavailable. The retry queue 122 and the allocation queues 120 are further discussed with reference to FIG. 5.

Resource Queues

Figure 3:
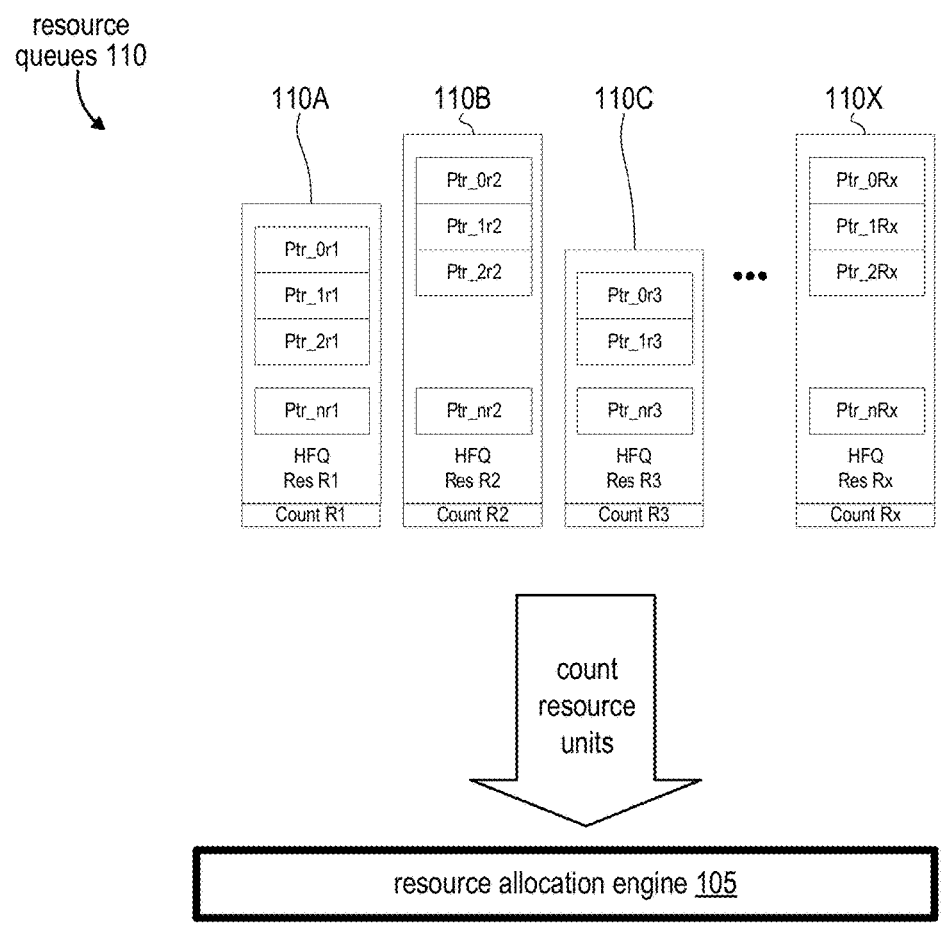
FIG. 3 is a conceptual block diagram of the resource queues.

Referring now to FIG. 3, a conceptual block diagram of the resource queues 110 is shown. The RAE 105 populates each resource queue (110A-110X) to count (e.g., perform an accounting of) the number of units for each resource type in the system. Each unit of a resource type (e.g., gigabyte of shared DRAM) is associated with a unique pointer in a resource queue 110. When the RAE 105 adds a pointer to a resource queue 110, the resource queue 110 auto-increases the count of pointers (Count Rx). As further discussed herein with reference to FIG. 5, the RAE 105 can use the resource queues 110 to update, maintain, and receive a status update for the number of units available for each resource type.

In FIG. 3, each resource queue 110A-110X is a first in first out (FIFO) queue that the RAE 105 populates with pointers. In one embedment, each resource queue 110A-110X is a hardware FIFO queue (HFQ). A queue is referred to as an HFQ for explanatory purposes. Implemented a queue in hardware may yield more efficient performance. However, any queue in the present technology is not necessarily hardware. A queue can include hardware, software, or a combination thereof.

Each resource queue (110A-110X) is associated with each type of computer resource that is sharable in the data center 100 and server 102 with the client CPUS. The plurality of resource queues 110A-110x are associated with the different types of sharable computer resources R1 through Rx. Each different type of shareable computer resource (Rx) is associated with one resource queue.

Each sharable resource type (R1-Rx) occupies an HFQ and initially has a number of units of resource types. For example, the resource queue 110x has a "count register" or counter that initially indicates N total number of resource units in the queue that are available to allocate. At any given time, an M number of units in the resource queue 110x represent the number of available units of the resource type Rx. These unit counts are maintained by the HFQ "count register" or counter (Count Rx). For example, one unit of a memory resource may be one memory block of a particular size (e.g., 4096 bytes or other suitable size). Accordingly, the HFQ "count register" or counter (Count Rx) would indicate the total blocks of the shared memory resource that are available. A non-destructive "peek" operation of the "count register" or counter may be performed to determine the number of units of a resource type that may be currently available.

For example, the resource queue 110A may be a hardware FIFO queue (HFQ) that includes pointers Ptr_0r1 through Ptr_nr1. Each pointer in the resource queue 110A may point to a memory address associated with a starting location (e.g., value) in global external memory (e.g., DDR SDRAM) of one unit of DRAM. The resource queue 110б may be an HFQ that includes pointers Ptr_0r2 through Ptr_nr2. Each pointer in the resource queue 110б may point to a starting memory address associated with a location (e.g., value) in on-chip synchronous random access memory (SRAM) associated with a unit of SRAM. The resource queue 110C may be an HFQ that includes pointers Ptr_0r3 through Ptr_nr3. Each pointer in the resource queue 110C may point to a memory address associated with a location (e.g., value) of a serial port. The resource queue 110x may be an HFQ that includes pointers Ptr_0rx through Ptr_nrx. Each pointer in the resource queue 110x may point to a memory address associated with a location (e.g., value) in a direct memory access (DMA) engine, and so on.

Request Queue

Figure 4:
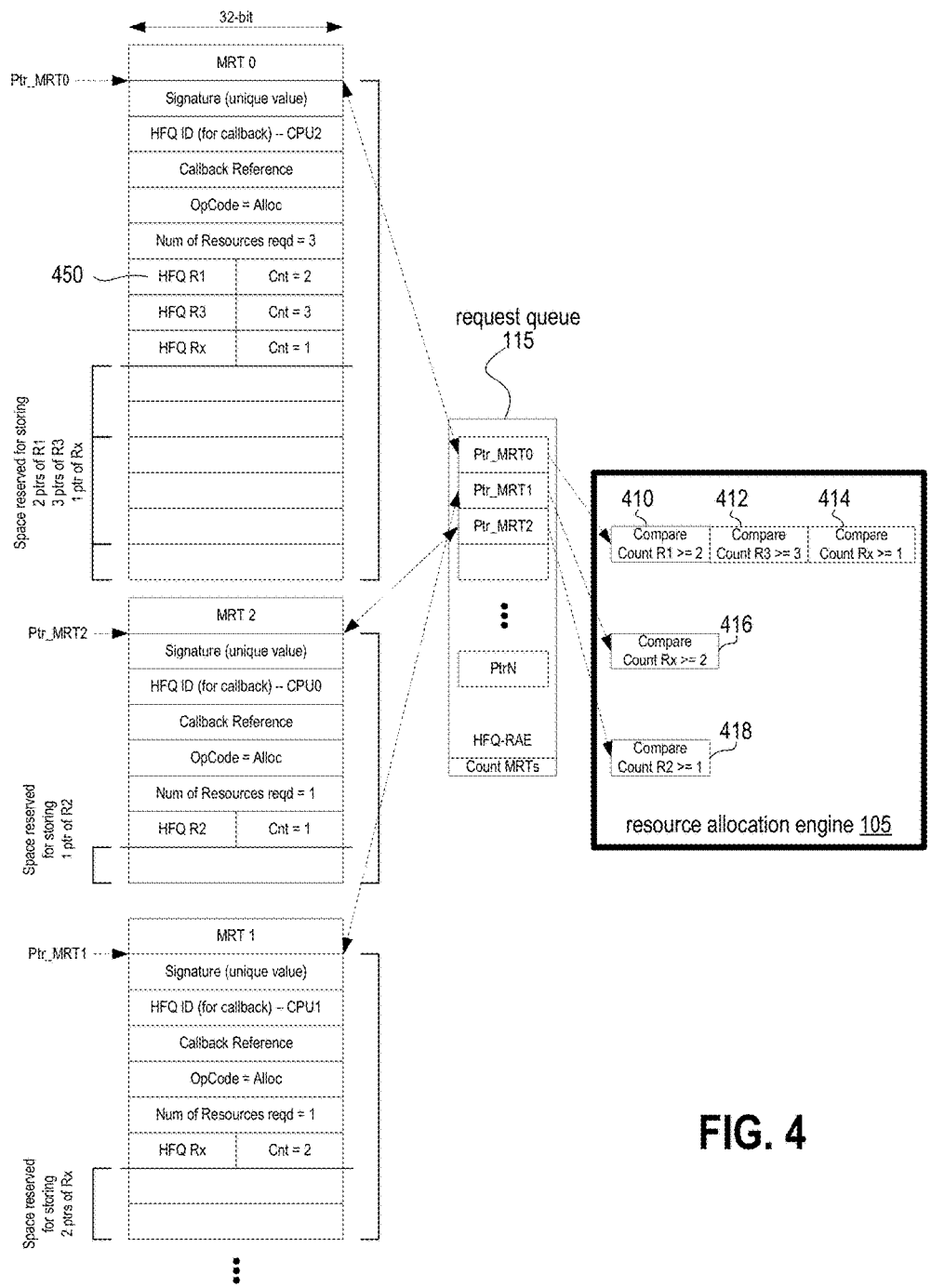
FIG. 4 is a conceptual block diagram of the request queue.

Referring now to FIG. 4, a conceptual block diagram of the request queue 115 is shown associated with a plurality of multi-resource tickets MRT0, MRT1, MRT2. MRTn stored in a storage device (e.g., memory, not shown) coupled to the RAE 105 or a part of the RAE 105. The request queue 115 includes a plurality of pointers Ptr_MRT0 through Ptr_MTRn that respectively point to the plurality of multi-resource tickets MRT0 through MRTn. The request queue 115 counts (e.g., performs an accounting of) the number of multi-resource tickets (MRTs) generated or updated by the client CPUs, The count of MRTs in the request queue is maintained by a "count register" or counter (Count MRTs). A "peek" operation may be performed on the "count register" or counter (Count MRTs) to determine the number of MRTs in the request queue. The request queue 115 may be, for example, a FIFO queue implemented in hardware.

Processors (e.g., client CPUs) interested in allocating multiple resources atomically will prepare an MRT and submit a pointer (e.g., Ptr_MRTn) to the MRT in the request queue 115, which is maintained by the RAE 105. Each client CPU pushes one or more pointers to MRTs into the request queue 115, thereby guaranteeing service and fairness (e.g., first-come-first-served via the FIFO queue). For example, as shown in FIG. 4, request queue 115 includes a pointer Ptr_MRT0 pointing to MRT0, a pointer Ptr_MRT2 pointing to MRT2, and a pointer Ptr_MRT1 pointing to MRT1. Generally, a pointer Ptr_MRTn in the request queue 115 points to a multi-resource ticket MRTn.

Each multi-resource ticket MRT is stored in a storage device. Each multi-resource ticket MRT has a data structure that includes the type and quantity (e.g., units) of resources that a client CPU has requested. The MRTs of FIG. 4 each include one or more data bit fields. For example, a field for signature includes an identifier (e.g., value) to uniquely identify an MRT. As shown in FIG. 4, MRT0, MRT1, and MRT2 each includes "Signature (unique value)" as a placeholder.

Figure 5:
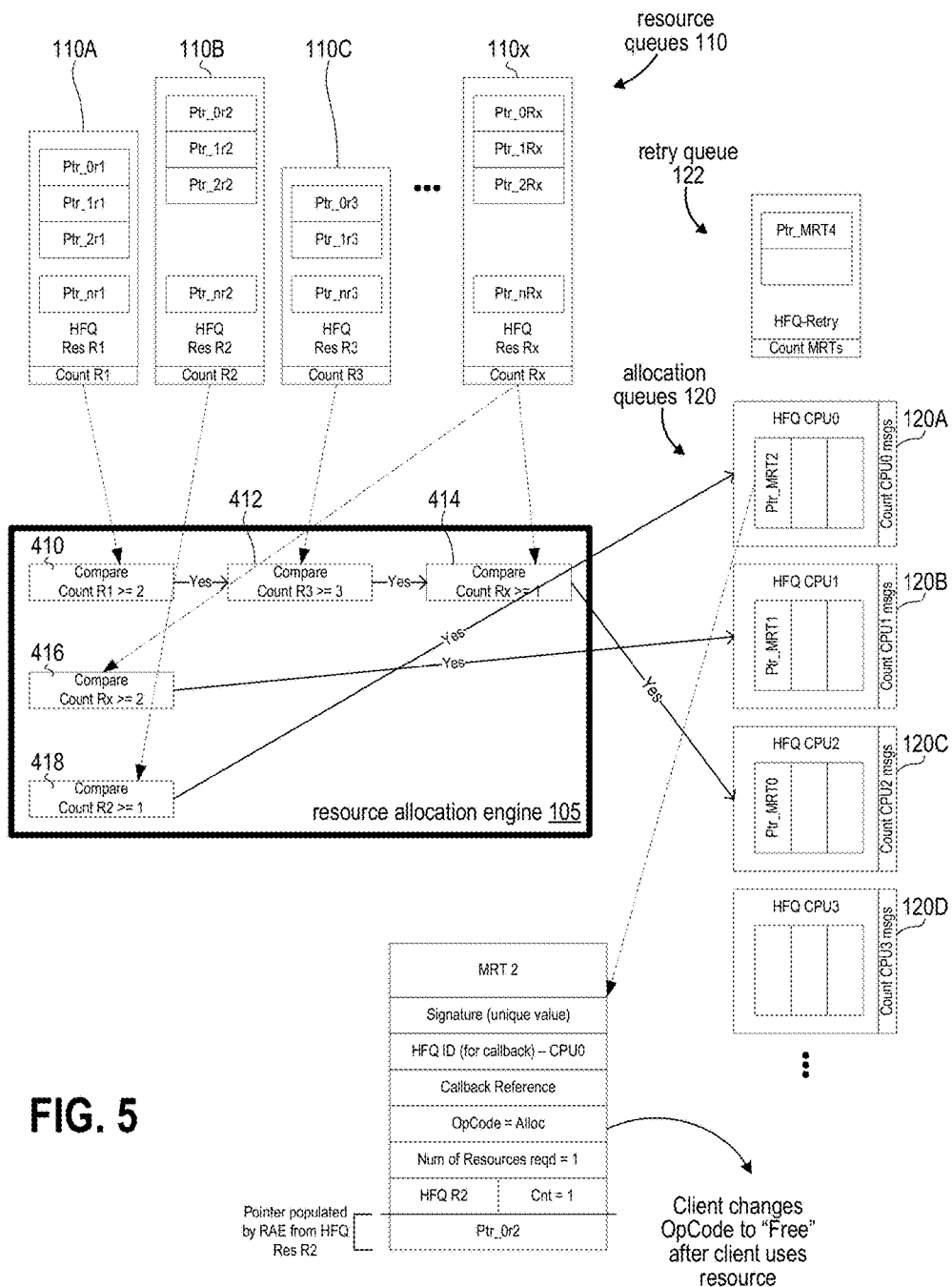
FIG. 5 is a conceptual block diagram of the allocation queues and the retry queue.

Each CPU client maintains its own hardware FIFO allocation queue (HFQ CPUn or CPU allocation queue) to receive pointers to the MRTs that have been allocated (see allocation queues 120A-120D shown in FIG. 5). The HFQ ID address (e.g., callback address) in the MRT identifies the client specific queue address where the response is to be sent when the MRT has a successfully allocated resource.

A field for HFQ ID address (e.g., callback address) includes the address of the HFQ where the MRT needs to be delivered after the resource request has been completed. The HFQ ID address is setup by the client CPU, which handles the associated CPU allocation queue. As shown in FIG. 4, MRT0 includes an HFQ ID of "CPU2"; meaning client CPU2 is handling the CPU2 allocation queue (HFQ) for the delivery of MRT0. MRT2 includes an HFQ ID of "CPU0"; meaning client CPU0 is handling the CPU0 allocation queue (HFQ) for the delivery of MRT2. MRT1 includes an HFQ ID of "CPU1"; meaning client CPU1 is handling the CPU1 allocation queue (HFQ) for the delivery of MRT1.

A field for callback reference includes the disambiguation reference for the client CPU. A disambiguation reference is a value that enables the client CPU to indirectly access a particular datum (e.g., variable or a record) in the computer's memory or in some other storage device. For example, the callback reference can be either fixed to one or more 32 bit fields. Because the MRT packet format is the protocol between the client CPUs and the RAE 105, the protocol clearly indicates how many 32-bit fields for the callback reference are in the MRT. FIG. 4 shows only one 32-bit field for the callback reference for explanatory purposes. An additional field (not shown) can be added to indicate the count of requested resources, such as "SkipU32sToNum Resources" to make the field generic. As shown in FIG. 4, MRT0, MRT1, and MRT2 each includes a "Callback Reference".

A field for operation code (OpCode) indicates the requested resources are set for allocate (e.g., Operational Code set to "Alloc") or release (e.g., Operational Code set to "Free"). An "allocate" operation code means a client CPU has requested the RAE 105 to allocate one or more resources. A "release" operation code means a client CPU has requested the RAE 105 to release one or more allocated resources As shown in FIG. 4, MRT0, MRT1, and MRT2 each includes an operation code of "OpCode=Alloc" because they are computer resource requests associated with instructions that have yet to be executed.

A field for resources number indicates the number of different types of resources requested or required. As shown in FIG. 4, MRT0 indicates "Num of Resources reqd=3", meaning CPU2 is requesting 3 different types of resources. MRT2 indicates "Num of Resources reqd=1", meaning CPU0 is requesting 1 type of resource. MRT1 indicates "Num of Resources reqd=1", meaning CPU1 is requesting 1 type of resource.

Each MRT further includes one or more resource request fields 450 that identity the particular resource queue that is requested (e.g., one of resource queues 110A-110x shown in FIG. 3) and the quantity or count or resource units requested. The one or more resource request fields 450 for requested resource type identifies the particular FIFO queue and may include a current operation code (e.g., allocate or release) for the requested resource. For example, HFQ R1 is the HFQ identifier of resource queue 110A (e.g., the resource queue for resource R1). As shown in FIG. 4, MRT0 includes queue identifiers "HFQ R1", "HFQ R3", and "HFQ Rx". MRT2 includes queue identifier "HFQ R2". MRT1 includes queue identifier "HFQ Rx".

The field for requested resource units (e.g., count) in the one or more resource request fields 450 indicates a number of units needed of the requested resource. For example, MRT0 includes "Cnt=2" for HFQ R1, "Cnt=3" for HFQ R3, and "Cnt=1" for HFQ Rx. MRT2 includes "Cnt=1" for HFQ R2. MRT1 includes "Cnt=2" for HFQ Rx. The field pair of HFQ Rx and Cnt i continues for the next resource, until all resources needed have been specified in one or more resource request fields 450 in the MRT. The number of resource request fields 450 is the number specified in the "Number of Resources Reqd" field (e.g., set to three in FIG. 4).

Below the one or more resource request fields 450, are one or more reserved pointer fields, one for each resource unit being requested. Each pointer field will hold a pointer to each resource unit that is allocated by the RAE. This is so the client CPU knows what resource unit to use for executing the tasks associated with the instruction code. For example, in MRT0 there are two pointer fields reserved for two units of resource one R1, three pointer fields for three units of resource three R3, and one pointer field for one unit of resource Rx. Accordingly, the number of reserved pointer fields is equal in number to the total of resource units requested for each type of resource. The values of the pointers in this array of one or more reserved pointer fields is set by the RAE when it allocates the requested resource pointers from the resource queues for the client CPU, thereby completing the service of the MRT. Upon completing the allocation, each of these pointer fields in the MRT then stores the address to the resource unit that was allocated to the client CPU.

Each client CPU is responsible for generating an MRT, and then responsible for submitting the MRT to the request queue 115 associated with the RAE 105. The request queue 115 serves to notify the RAE about the MRT.

Allocation Queues and Retry Queue

In FIG. 4, the RAE 105 receives an MRT, parses the MRT, and checks the number of units requested of each resource type against the "count register" of the corresponding resource queue 110x. These comparison operations are now further discussed with reference to FIG. 5.

Referring now to FIG. 5, a conceptual block diagram of resource queues 110, allocation queues 120, and a retry queue 122 associated with the RAE 105 is shown. The RAE 105 parses and compares each MRT before the RAE 105 moving on to process the next MRT.

For example, consider a compare operation 410. The RAE 105 checks if the count of resource queue 110A has at least a count of 2 units of resources that are being requested by MRT0 (a comparison of greater than or equal to two). If "yes", then the next compare operation 412 is performed. At the compare operation 412, the RAE 105 checks if the count of resource queue 110C has at least a count of 3 units of resources to meet that being requested by MRT0. If "yes", then the next compare operation 414 is performed. At the compare operation 414, the RAE 105 checks to see if the counter of resource queue 110x has at least a count of 1 unit of resources that is being requested in MRT0. If "yes", then that means all of the resource compare operations passed and there are sufficient computer resources available for MRT0 and its associated instruction to be performed.

Accordingly, the RAE 105 pops (e.g., copies) each number of units requested from each specified resource queue (110A, 110C, and 110x). Each specified resource queue (110A, 110C, and 110x) auto-decrements its counter (e.g., Count Rx) and the count of resource units that are available. In one embodiment, only the RAE 105 can pop (e.g., copy) a resource unit from each specified resource queue (110A, 110C, and 110x) so there is no contention. The RAE 105 copies values of the units allocated (e.g., popped) from each queue (110A, 110C, and 110x) and updates the values into the MRT0 at the proper offset for the corresponding resource type and unit number being allocated.

However, any of the resource compare operations (410, 412, 414) can fail for resources requested by the MRT0. If any such failure occurs, then the RAE 105 places the pointer for MRT0 into the retry queue 122.

Each client CPU has a CPU allocation queue 120, with a counter (Count CPUn msgs) that counts the resource granted notification or MRT completed notification. For example, the client CPU2 has a CPU allocation queue 120C with a counter (Count CPU2 msgs). After successful allocation, the RAE 105 pushes the pointer Ptr_MRT0 into the callback address (e.g., HFQ address specified in MRT0) into the proper CPU allocation queue 120C, thereby notifying client CPU2 that the RAE 105 has completed allocating computer resources for MRT0 and that the client CPU can use those resources. For example, the act of putting the pointer Ptr_MRT0 into the client allocation queue 120C generates an interrupt, thereby notifying client CPU2 that the RAE 105 has completed allocating resources requested by MRT0. Thus, with the pointer for MRT0 in the CPU allocation queue 120C, the client CPU2 has all the requested resources available for use by the client CPU2 in completing the tasks of an instruction associated with MRT0.

However, if any of these compare operations (410, 412, 414) had failed, then the RAE 105 would have processed the failed MRTs according to a retry policy module in the RAE 105. The RAE 105 would have placed and held a pointer for MRT0 in the retry queue 122. The RAE 105 would compare MRT0 in subsequent operations when resources are freed. (Note that in the example of FIG. 5, MRT0 did not actually fail any compare operations.)

The retry policy module includes a control mechanism in the RAE 105 that decides how the retry queue 122 is handled. This control mechanism can include a binary retry option, including maximum utilization or quality of service, as described below. Alternatively, the control mechanism can include a more precisely calculated combination (e.g., subtly controlled dial switch) of the binary retry option.

The first retry option is to maximize utilization. Utilization implies maximum use of available resources. When using this first option, the RAE 105 services all MRTs in the retry queue 122 after any free operation, but will move on to servicing the request queues(s) 110 after that. In this option, the RAE 105 services all MRTs in the retry queue 122 before servicing any new allocation MRT from a request queue 115. However, the RAE 105 does a "scan" operation of the request queue 115 looking for "free" MRTs (e.g., MRTs having an operation code of "free"). When a free MRT is found, the RAE 105 removes the free MRT from the request queue 115 and services the free MRT, thereby freeing resources. After each free MRT is serviced, the RAE 105 attempts to service (e.g., empty) the retry queue 122 again. If any MRT requests are still in the retry queue 122, then the scan operation resumes.

Accordingly, in one embodiment, the priority order of operations for the RAE 105 to service MRTs includes the following: first, service any MRT having an operation code (OpCode) of "Free"; second, service any MRT (e.g., the MRT4) in the retry queue 122; and then third, service any MRTs in the request queue 115. If an MRT in the retry queue 122 fails again, then the RAE 105 sends that MRT to the end of the retry queue 122. However, the RAE 105 is configured not to re-service that failed MRT in the same iteration. For example, the RAE 105 can look at the count of entries in the retry queue 122 before starting to service the retry queue 122; for a given iteration, the RAE 105 services only the counted number of entries in the retry queue 122.

The second retry option is Quality of Service (QoS). QoS implies strict ordering of incoming requests. For example, there can be two incoming request queues 115 (e.g., a request queue for allocation and a request queue for freeing resources). For example, the RAE 105 separates "free" MRTs from "allocate" MRTs by using two incoming request queues 115 (e.g., a request queue for allocating resources and another request queue for freeing resources). The RAE 105 services the retry queue 122 after every free operation, but will not service the request queue 115 for allocation until the retry queue 122 is not empty. The RAE 105 will service only the "free" request queue 115 while the retry queue 122 is not empty.

The client CPUs can specify how the RAE 105 chooses between the two retry options. Alternatively, the client CPUs can specify how the RAE 105 chooses any setting between the two retry options. For example, the RAE 105 can be set with an aging timer, such that if an MRT is in the retry queue 122 for a predetermined amount of time, then the RAE 105 switches to the QoS option until that MRT is serviced. Then the RAE 105 switches back to the utilization option.

As shown in FIG. 5, the RAE 105 has used the retry policy module (described above) to pop (e.g., copy) a pointer Ptr_MTR4 (for MRT4) from the request queue 115 and place the pointer into the retry queue 122. This means MRT4 previously had failed a resource compare operation that was performed by the RAE 105. In accordance with the retry policy module, in response to resources being freed, the RAE 105 will compare the resources requested in the MRT4 again to determine if the resources can be allocated.

After the RAE 105 services MRT0, the RAE 105 then moves to service the next MRT. For example, the RAE 105 next services MRT1 by performing resource comparison operations for the resources request by MRT1. The RAE 105 performs a resource compare operation 416 by checking if the resource unit count of the resource queue 110x is at least a count of 2 resource units that is being requested in MRT1. If "yes", all of the compare operations passed for MRT1 have passed with no further computer resources being requested by the multi-resource ticked to execute the associated tasks for an instruction.

Accordingly, the RAE 105 pops (e.g., copies) the 2 resource units requested from queue 110x. The specified queue 110x auto-decrements the count of resource units from the counter Count Rx. In one embodiment, only the RAE 105 can pop (e.g., copy) a unit from the specified queue 110x so there is no contention. The RAE 105 copies (e.g., pops) values of the units allocated from the queue 110x and then writes (e.g., loads) the values into MRT1 at the proper offset for the corresponding resource type and unit number.

The client CPU1 has an allocation queue 120B, with a counter (Count CPU1 msgs) that counts the resource granted notification or MRT completed notification. The RAE 105 pushes the pointer Ptr_MRT1 into the callback address (e.g., HFQ address specified in MRT1) in the proper allocation queue 120B, thereby notifying client CPU1 that the RAE 105 has completed allocating resources requested by MRT1. For example, the act of putting the pointer Ptr_MRT1 into the client allocation queue 120B generates an interrupt, thereby notifying client CPU1 that the RAE 105 has completed allocating resources requested by MRT1. Thus, the client CPU1 then has all the resources requested for use by the client CPU1.

However, if the resource compare operation 416 had failed, then the RAE 105 would have held a pointer for MRT1 in retry queue 122. The RAE 105 would then perform a resource comparison once again for MRT1 in subsequent operations when resources are freed. (Note that in the example of FIG. 5, the resource comparisons for MRT1 did not fail any compare operations.)

After the RAE 105 services MRT1, the RAE 105 then services the next MRT, MRT2. The RAE performs resource comparison operations for the computer resources requested in MRT2. For example, a resource compare operation 418 is performed by the RAE. The RAE 105 checks to see if the count of the resource counter Count R2 of resource queue 1106 is at least a count of 1 unit of resources that is being requested by MRT2. If "yes", with no further resource comparison, then that means all of the compare operations passed for MRT2.

Accordingly, the RAE 105 pops (e.g., copies) the one unit or resources requested from the resource queue 1106. The specified resource queue 1106 auto-decrements its count of resource units held by the counter Count R2. Only the RAE 105 can pop (e.g., copy) a unit from the specified queue 1106 so there is no contention. The RAE 105 copies (e.g., pops) values of the unit allocated from the queue 1106 and then pastes the values into MRT2 at the proper offset for the corresponding resource type and unit number.

The client CPU0 has a CPU allocation queue 120A with a counter (Count CPU0 msgs) that counts the resource granted notifications or MRT completed notifications. The RAE 105 pushes the pointer Ptr_MRT2 into the callback address (e.g., HFQ address specified in MRT2) in the proper allocation queue 120A, thereby notifying client CPU0 that the RAE 105 has completed allocating resources for MRT2. For example, the act of putting the pointer Ptr_MRT2 into the client allocation queue 120A generates an interrupt, thereby notifying client CPU0 that the RAE 105 has completed allocating resources requested by MRT2. Thus, the client CPU0 then has all the resources requested in the MRT for use by the client CPU0.

Note, if the resource compare operation 418 had failed, then the RAE 105 would have generated and held a pointer for MRT2 in retry queue 122. The RAE 105 then performs further resource comparisons of those requested in MRT2 in subsequent operations when resources are freed. (Note that in the example of FIG. 5, MRT2 did not fail any resource compare operation.)

Releasing Resources

As described with reference to FIG. 4, an operation code (OpCode) in a given MRT that is set to "allocate" indicates the requested operation type is set for allocating units of one or more requested resources. The allocated resource units hold the allocate code until the designated client CPU completes using those allocated resource units with the associated instruction. When the designated client CPU completes using those allocated resource units associated with an MRT, the designated client CPU and the RAE 105 may begin operations to release (e.g., free) those computer resources.

After using the allocated resources and when those resources are no longer required by the client, the client CPU submits same MRT used for allocating the resources to the RAE. However, this time, the OpCode is set to release resources rather than allocate resources. For example, as shown in FIG. 5, the client CPU changes the OpCode field from "Alloc" to "Free" and sends the same MRT to the RAE 105. The RAE 105 receives the MRT with the Free opcode and puts (e.g., pushes) the designated number of resource units back into the respective resource queue 110$x$, effectively making the resource units of the given type available for re-use. Each respective queue 110$x$ auto-increments the count in its counter accordingly to indicate an increase in the de-allocated resource units being available.

The RAE 105 notifies the client CPU about completing the free/de-allocation process similar to how it notifies the client CPU about completing the allocation process but with the MRT opcode being changed. For example, the RAE 105 notifies the client CPU0 about free/de-allocation of resources associated with MRT2 in the substantially same way the RAE 105 notified the client CPU0 when resources were allocated. The client CPU0 can then re-use the MRT2 (with the opcode set to Allocate) if it so desires without regeneration. For example, the client CPU0 can reuse MRT2 with the same requested resource units to re-execute the same instruction at another point in time.

After a resource release operation, the RAE 105 can use the release as a trigger to service the MRTs in the retry queue 122 before servicing MRTs in the normal request queue 115. Such an order of operation ensures the RAE 105 is performing fairness in resource allocation. Thus, the atomic resource allocation cycle continues.

Components of Resource Allocation Engine

Figure 6:
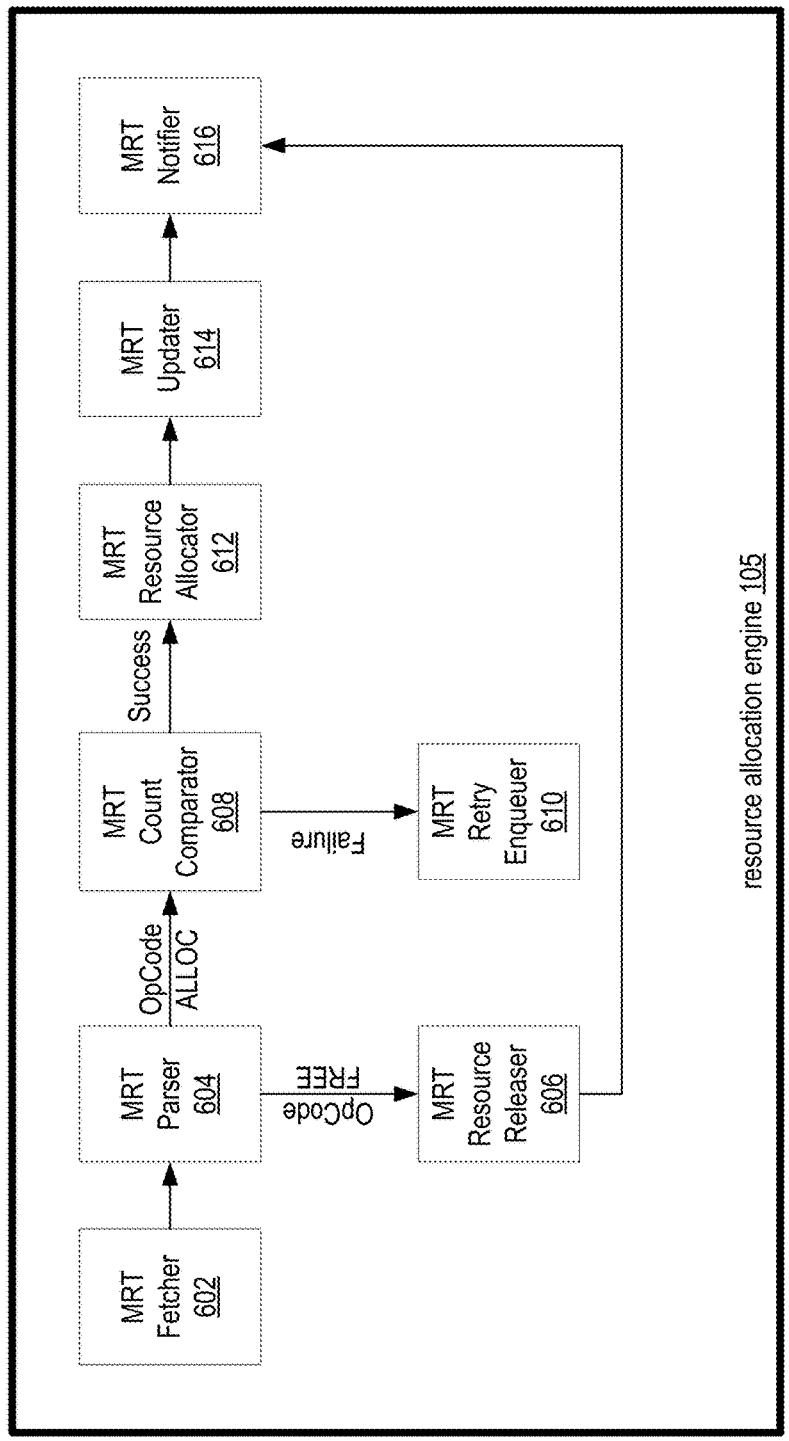
FIG. 6 is a conceptual block diagram of components of the resource allocation engine.

Referring now to FIG. 6, a conceptual block diagram of components of the resource allocation engine (RAE) 105 is shown coupled together. The RAE 105 includes an MRT fetcher 602, an MRT parser 604, an MRT resource releaser 606, an MRT count comparator 608, an MRT retry enqueuer 610, an MRT resource allocator 612, an MRT updater 614, and an MRT notifier 616. Each component of the RAE 105 is hardware, software, or a combination of hardware and software.

For the sake of simplicity, a brief summary of the operations of the components of the RAE 105 is described with reference to FIG. 6. However, the components of the RAE 105 are not limited to these operations discussed with reference to FIG. 6. Each component of the RAE 105 may carry out of one or more other operations described herein with reference to FIGS. 1 through 5.

For example, the MRT fetcher 602 can fetch the next MRT to service from the request queue 115 shown in FIG. 1. The MRT fetcher 602 may also fetch an MRT to retry servicing from the retry queue shown in FIG. 5 when sufficient resources are freed. The MRT parser 604 receives the fetched MRT from the MRT fetcher 602 and can parse the elements of the MRT. The MRT parser can then identify an OpCode that is set either to "Alloc" for or "Free" for example. If the OpCode is set to "Free", then the MRT is passed to the MRT resource releaser 606. If the OpCode is set to "Alloc", then the MRT is passed to the MRT count comparator 608.

If the OpCode set to "Free", the MRT resource releaser 606 releases the corresponding computer resource from allocation by pushing the resource pointers (in the MRT) into the respective resource queues. This process automatically increases the count value in the counter of the respective resource queue by the total unit amount of resources freed up. The MRT notifier 616 then notifies the specified client CPU about the freed resources by sending the MRT back with the Free opcode.

If the OpCode is set to "Alloc", then the MRT count comparator 608 performs one or more resource comparisons with the resources requested within the MRT with the resource unit counts of the one or more specified resource queues 110x. If the MRT fails the resource count comparison operations, then the MRT is passed to the MRT Retry enqueuer 610. If the MRT passes the resource comparison operations, then the MRT is passed to the MRT resource allocator 612.

If the MRT fails the resource comparison operations, the MRT retry enqueuer 610 pushed the MRT pointer to the retry queue 122, which effectively puts the pushed MRT pointer to the end of Retry Queue If the MRT passes the resource comparison operations, the MRT resource allocator 612 allocates the specified resources for the specified client CPU. The MRT is then passed to the MRT updater 614.

The MRT updater 614 then updates the MRT with the value of resource pointer popped from resource queue at the proper offset for the corresponding resource type and unit number indicating each unit of resource that is allocated by a pointer. Then, the MRT notifier 616 notifies the specified client CPU about the allocation by writing a pointer into the CPU allocation queue.

Method Overview

Methods (700, 800, 900, 1000, and 1100) shown in FIGS. 7 through 11 may be performed by one or more components of the RAE 105 to process MRTs and fairly allocate shared computer resources to a plurality of processors. The components of the RAE 105 are discussed with reference to FIGS. 1 through 6. However, the methods are not so limited. In another embodiment, one or more other devices of the data center 100 may carry out one or more operations of the methods to process MRTs and fairly allocate shared computer resources.

Figure 7:
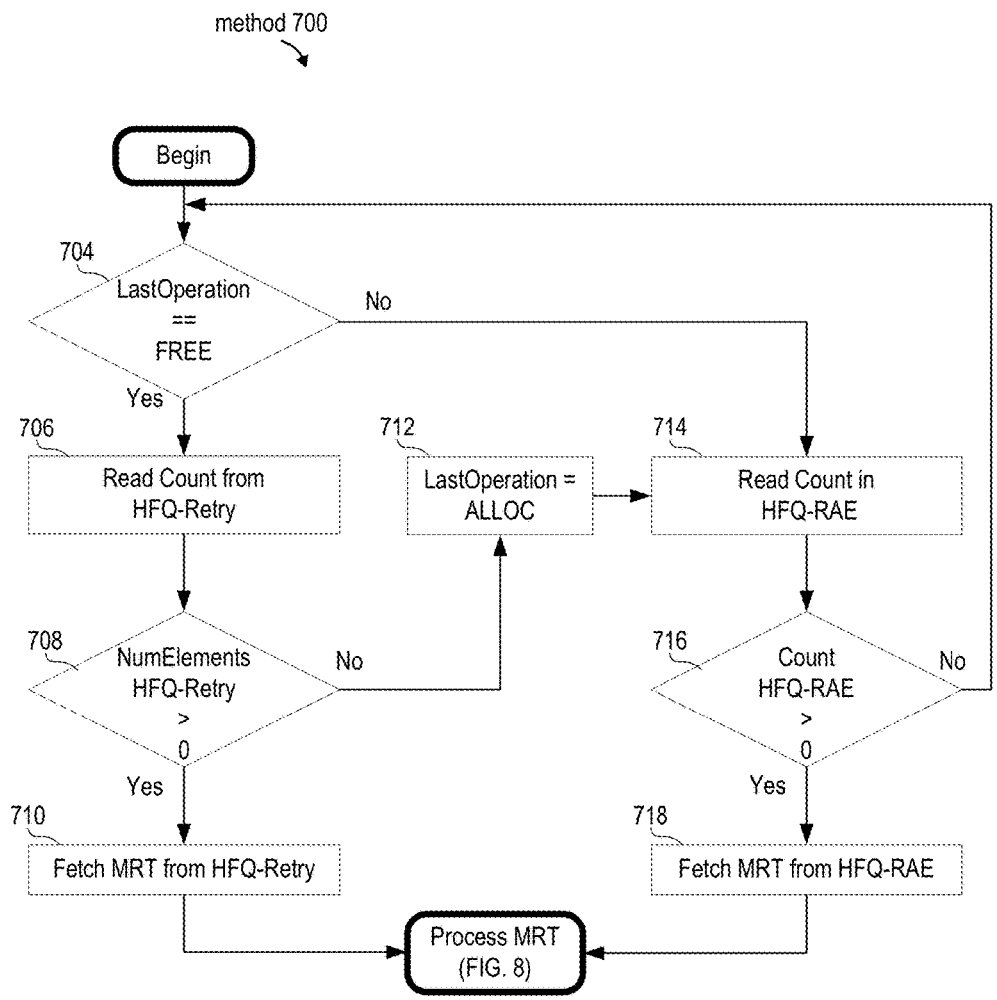
FIG. 7 is a flowchart of a method for fetching an MRT.

Referring now to FIG. 7, a flowchart of a method 700 for fetching an MRT is shown. At a beginning, the method 700 moves to a decision operation 704.

At decision operation 704, the RAE 105 determines if the last operation was to free a resource. If the last operation was not to free a resource, the decisions operation 704 is "no" and the process goes to operation 714. However, If the last operation was to free a resource, the decision operation 704 is "yes" at decision 704, and the process goes to operation 706.

At operation 706, with the last operation freeing a resource, the RAE 105 reads the MRT count of MRT pointers in the counter Count MRTs in the retry queue 122. The process then goes to decision operation 708.

At decision operation 708, the RAE 105 determines if the number of elements (or units) in the retry queue 122 is greater than zero. If "yes" at decision 708, then the process goes to operation 710. However, if decision 708 is no, the operation goes to operation 712.

At operation 710, the RAE 105 fetches an MRT from the retry queue 122. The process then goes to process the MRT as explained with reference to FIG. 8.

At operation 712, the RAE 105 sets the flag "LastOperation" as ALLOC, and then goes to operation 714.

At operation 714, the last operation was not freeing a resource, the RAE 105 reads the MRT count from the counter Count MRTs in the request queue 115. The process then goes to decision operation 716.

At decision operation 716, the RAE 105 determines if the count of the MRT count in the counter of the request queue 115 is greater than zero. If it is not, decision operation 716 is "no" and the process of the RAE 105 returns back to the beginning of the method 700 and continues from decision operation 704 again. However, if the count of the MRT count in the counter of the request queue 115 is greater than zero, the decision operation 716 is "yes", and the process goes to operation 718.

At operation 718, the RAE 105 fetches an MRT from the request queue 115 and then to process the MRT as explained with reference to FIG. 8.

Figure 8:
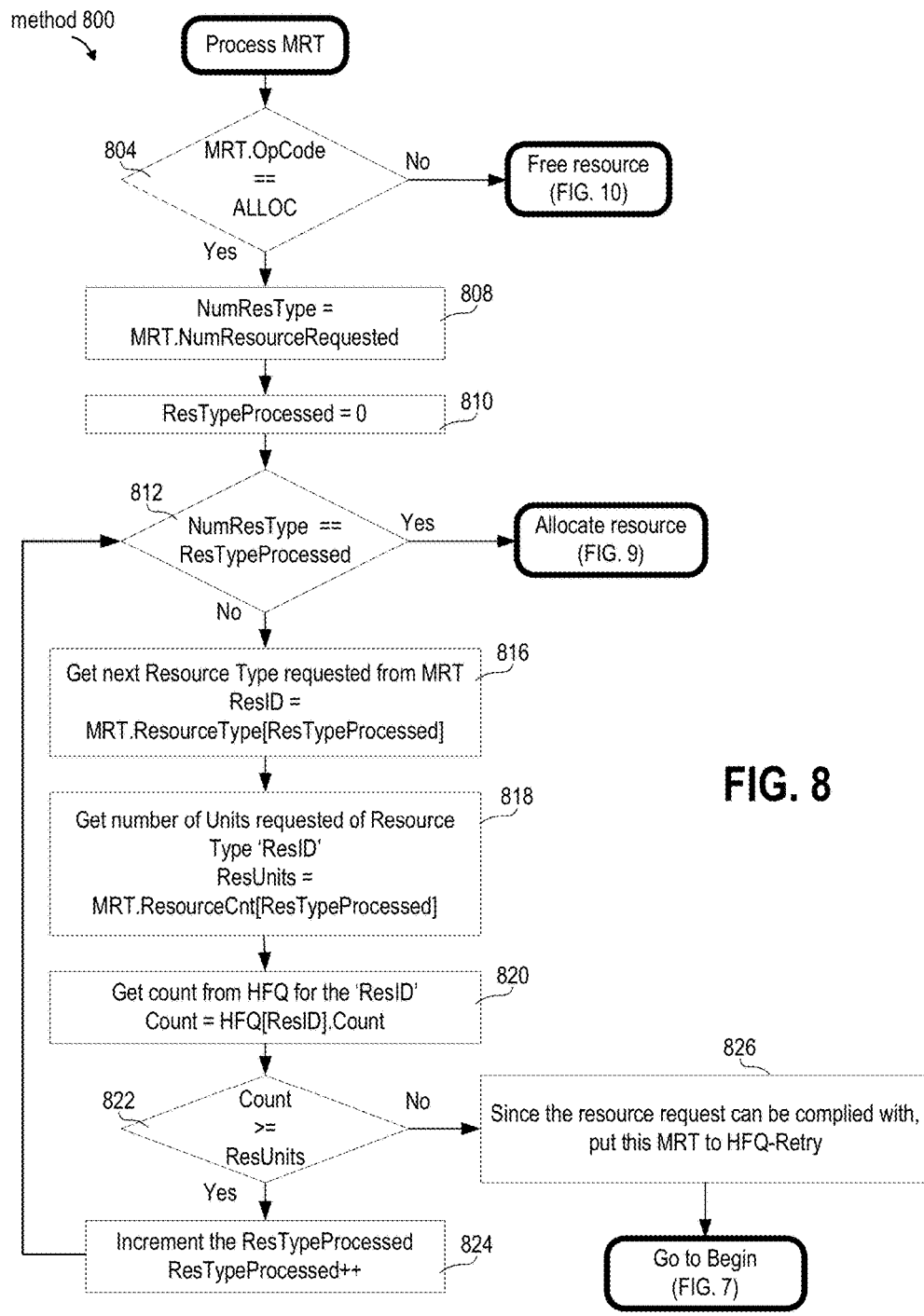
FIG. 8 is a flowchart of a method for processing (e.g., comparing) an MRT.

Referring now to FIG. 8, a flowchart of a method 800 for processing (e.g., comparing) an MRT is shown. The method 800 begins at a decision operation 804.

At decision operation 804, the RAE 105 determines if the OpCode field for the MRT is set to "Alloc". If "no" at decision 804, then the RAE 105 begins operation for freeing the resources of the MRT. See FIG. 10. However, if "yes" at decision 804, then the process goes to operation 808.

At operation 808, the RAE 105 sets (e.g., identifies) the number of resource types requested. For example, the RAE 105 checks the NumResType field of the MRT.

At operation 810, the RAE sets the number of resource types processed to zero. The process goes to decision operation 812.

At decision operation 812, the RAE 105 determines if the number of resource types requested is equal to the number of resource types processed. If "yes" at decision operation 812, then the RAE 105 begins operations for allocating resources of the MRT. See FIG. 9. However, if "no" at decision 812, then the process goes to operation 816.

At operation 816, the RAE105 gets the next resource type requested. For example, the RAE 105 checks the resource identifier field of the MRT. The process then goes to operation 818.

At operation 818, the RAE 105 gets the number of units requested for the current resource type. For example, the RAE 105 checks the quantity (e.g., units) field of the MRT. The process then goes to operation 820.

At operation 820, the RAE 105 gets the count from the resource queue 110 for the current resource type. The process then goes to decision operation 822.

At decision operation 822, the RAE 105 determines if the number of available units of a requested resource for the current resource type is greater than or equal to the number of resource units requested in the MRT. If the determination is "no" at decision operation 822, then the process goes to operation 826. However, if the determination is "yes" at decision operation 822, then the process goes to operation 824.

At operation 826, because units of a desired resource in the given MRT are unavailable, the RAE 105 puts) the pointer for the MRT into the retry queue 122, in accordance with the retry policy module, as described with reference to FIG. 5. Note that if the given MRT being processed was already from the retry queue 122 at the beginning of method 800, then the RAE 105 pushes the pointer for the MRT to the front of the retry queue 122, not at the end. Such escalation contributes to fairness in allocation/retry processing. Then, the RAE 105 returns to the beginning of method 700 in FIG. 7.

At operation, 824, the RAE 105 increments the number of resource types processed. Then, the RAE 105 returns to decision operation 812 and continues from there. According to decision operation 812, the RAE 105 allocates the requested resources for the client CPU if all resource types requested in an MRT are available. For example, the RAE 105 must determine that all of the requested units of the requested resources in the MRT are available before the RAE 105 allocates any of the requested resources to the client CPU.

Figure 9:
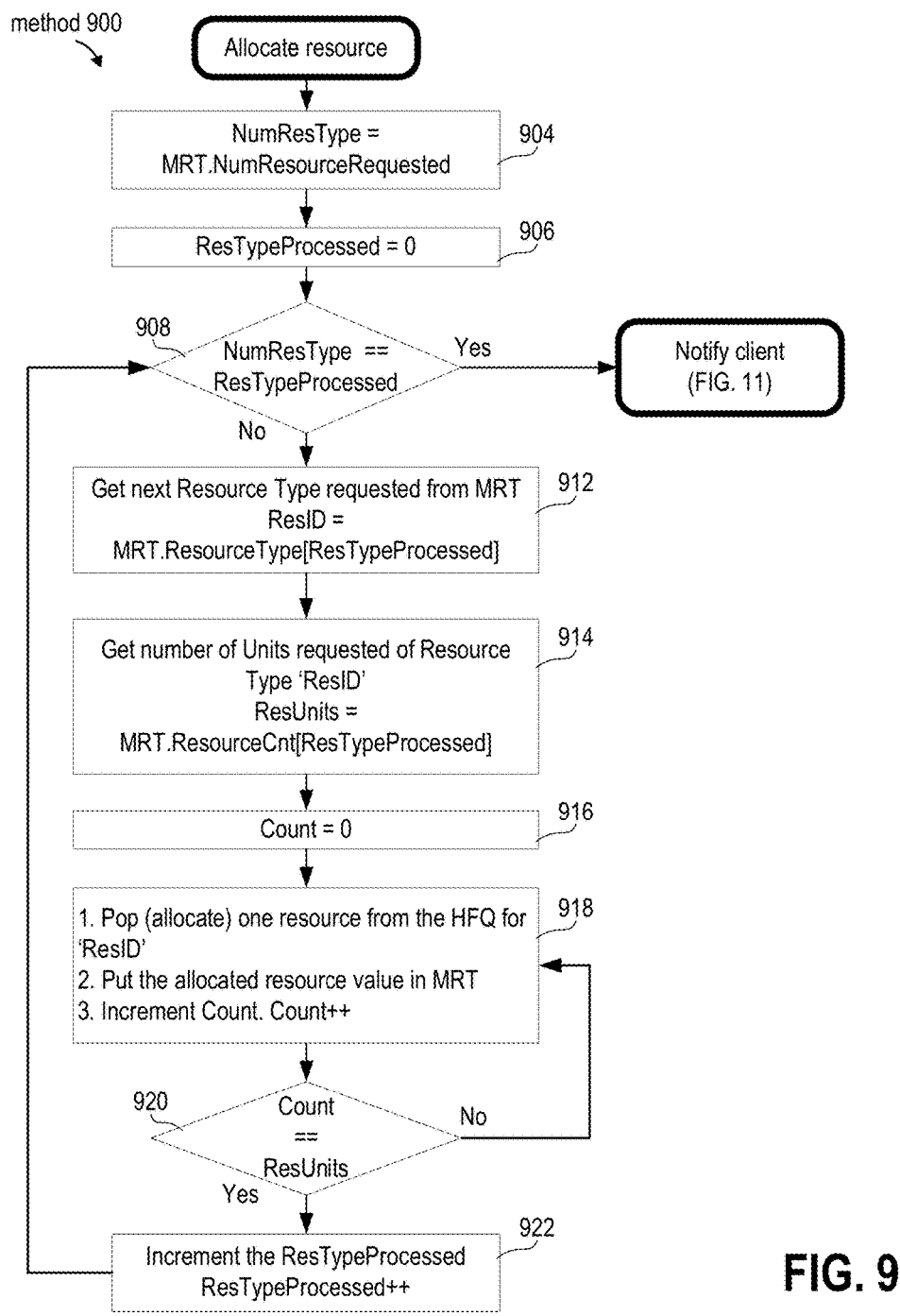
FIG. 9 is a flowchart of a method for allocating a resource for a client CPU.

Referring now to FIG. 9, a flowchart of a method 900 for allocating a resource for a client CPU is shown. The method 900 begins at operation 904.

At operation 904, the RAE 105 sets (e.g., identifies) the number of resource types requested. For example, the RAE 105 checks the NumResType field of the MRT. The process then goes to operation 906.

At operation 906, the RAE sets the number of resource types processed to zero. The process then goes to a decision operation 908.

At decision operation 908, the RAE 105 determines if the number of resource types requested is equal to the number of resource types processed. If "yes" the number of resource types requested is equal to the number of resource types processed at decision operation 908, then the RAE 105 begins operations of notifying the client CPU that associated with the MRT being processed. See FIG. 11. However, if "no" the number of resource types requested is not equal to the number of resource types processed at decision 908, then the process then goes to operation 912.

At operation 912, the RAE105 gets the next resource type requested. For example, the RAE 105 checks the resource identifier field of the MRT. The process then goes to operation 914.

At operation 914, the RAE 105 gets the number of units requested for the current resource type. For example, the RAE 105 checks the units field (e.g., ResourceCnt field) of the MRT. The process then goes to operation 916.

At operation 916, the RAE 105 sets a unit count for the current resource type to zero. The process then goes to operation 918.

At operation 918, the RAE 105 pops (e.g., copies or allocates) one resource unit from the resource queue 110 for the current resource type, puts the allocated resource value in the MRT, and increments the unit count for that resource. The process then goes to operation 920.

At decision 920, the RAE 105 determines if the unit count is equal to the number of requested units. If "no" at decision 920, then the RAE 105 returns to operation 918 and continues from there. However, if "yes" at decision 920, then the process then goes to operation 922.

At operation 922, the RAE 105 increments the number of resource types processed. Then, the RAE 105 returns to decision 908 and continues from there. According to decision 908, the RAE 105 only notifies the client CPU when the number of resource types processed is equal to the number of resource types requested.

Figure 10:
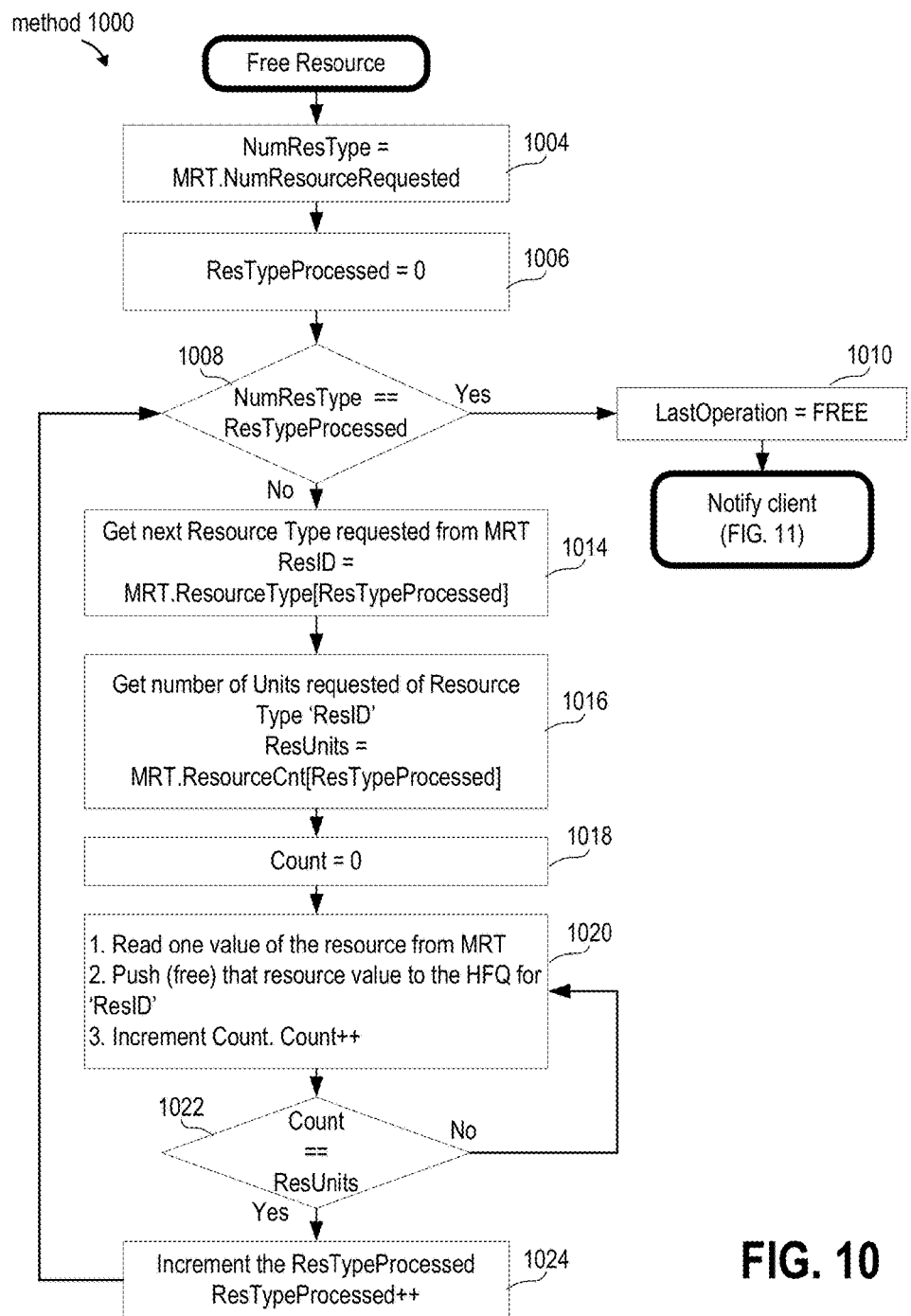
FIG. 10 is a flowchart of a method for freeing a resource from a client CPU.

Referring now to FIG. 10, a flowchart of a method 1000 for freeing a resource after being used by a client CPU is shown. Upon receiving an MRT with the opcode Free, the method 1000 begins with an operation 1004.

At operation 1004, the RAE 105 sets (e.g., identifies) the number of resource types requested by the MRT. For example, the RAE 105 checks the NumResType field of the MRT. The process then goes to operation 101*x*.

At operation 1006, the RAE sets the number of resource types processed to zero. The process then goes to a decision operation 1008.

At decision operation 1008, the RAE 105 determines if the number of resource types requested is equal to the number of resource types processed. If "yes", the number of resource types requested is equal to the number of resource types processed as determined by the decision operation 1008, then the process goes to operation 1010. However, if the decision operation 1008 determines that "no", the number of resource types requested is not equal to the number of resource types processed, then the process goes to operation 1014.

At operation 1010, the RAE 105 frees up the resources that were requested and allocated in the MRT. For example, the RAE 105 can change its internal flag for LastOperation to "Free" so that the RAE 105 can perform its next operation by using the retry queue 122. Then, the RAE 105 begins operations for notifying the client CPU associated with the MRT. See FIG. 11.

At operation 1014, the RAE105 gets the next resource type requested from the MRT. For example, the RAE 105 checks the resource identifier field of the MRT. The process then goes to operation 1016.

At operation 1016, the RAE 105 gets the number of units requested for the current resource type. For example, the RAE 105 checks the units field (e.g., ResourceCnt field) of the MRT. The process then goes to operation 1018.

At operation 1018, the RAE 105 sets a unit count for the current resource type equal to zero. The process then goes to operation 1020.

At operation 1020, the RAE 105 reads one of the current requested resource, pushes (e.g., frees) that resource value to the resource queue 110 for that resource. The the unit count of the requested resource is automatically incremented when the RAE 105 pushes the resource pointer into the resource queue 110. The process then goes to decision operation 1022.

At decision operation 1022, the RAE 105 determines if the unit count is equal to the number of requested units for the type of resource in the MRT. If "no", the unit count is determined not be equal to the number of requested units by decision operation 1022, then the RAE 105 returns to operation 1020 and continues from there. However, if "yes" the unit count is determined to be equal to the number of requested units bye decision operation 1022, then the process goes to operation 1024.

At operation 1024, the RAE 105 increments the number of resource types processed. Then, the process of the RAE 105 returns to the decision operation 1008 and continues from there. According to decision operation 1008, the RAE 105 notifies the client CPU of the freed resources with an MRT only when all resources in an MRT are released. That is, the RAE 105 only notifies the client CPU of the freed resources when the number of resource types processed is equal to the number of resource types requested.

Figure 11:
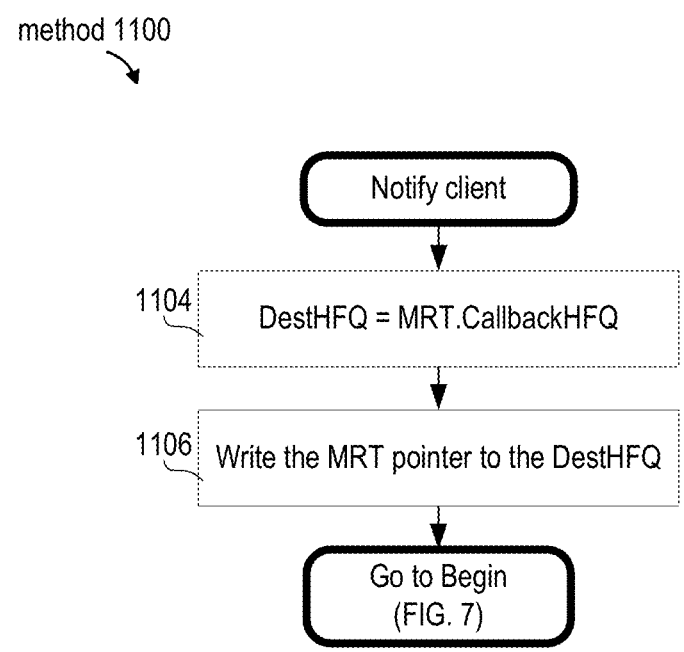
FIG. 11 is a flowchart of a method for notifying a client CPU when an MRT has been changed or has completed processing (e.g., resources are allocated or freed).

Referring now to FIG. 11, a flowchart of a method 1100 of notifying a client CPU when an MRT has been changed or has completed processing (e.g., resources are allocated or freed) is shown. The method 1100 begins with operation 1104.

At operation 1104, the RAE 105 sets the destination allocation queue 120 (e.g., DestHFQ) equal to the callback queue identified in the MRT. For example, the RAE 105 checks the CallbackHFQ field of the MRT. The process then goes to operation 1106.

At operation 1106, the RAE 105 writes the MRT pointer to one of the destination or CPU allocation queues 120 (e.g., Dest HFQ). The process then goes back to the beginning of method 700 with operation 704 to continue processing all of the MRTs.

Other operations, actions, processes, and/or details are discussed with reference to other figures and may be a part of the methods (700, 800, 900, 1000, and 1100), depending on the implementation.

Computer Apparatus

Figure 12:
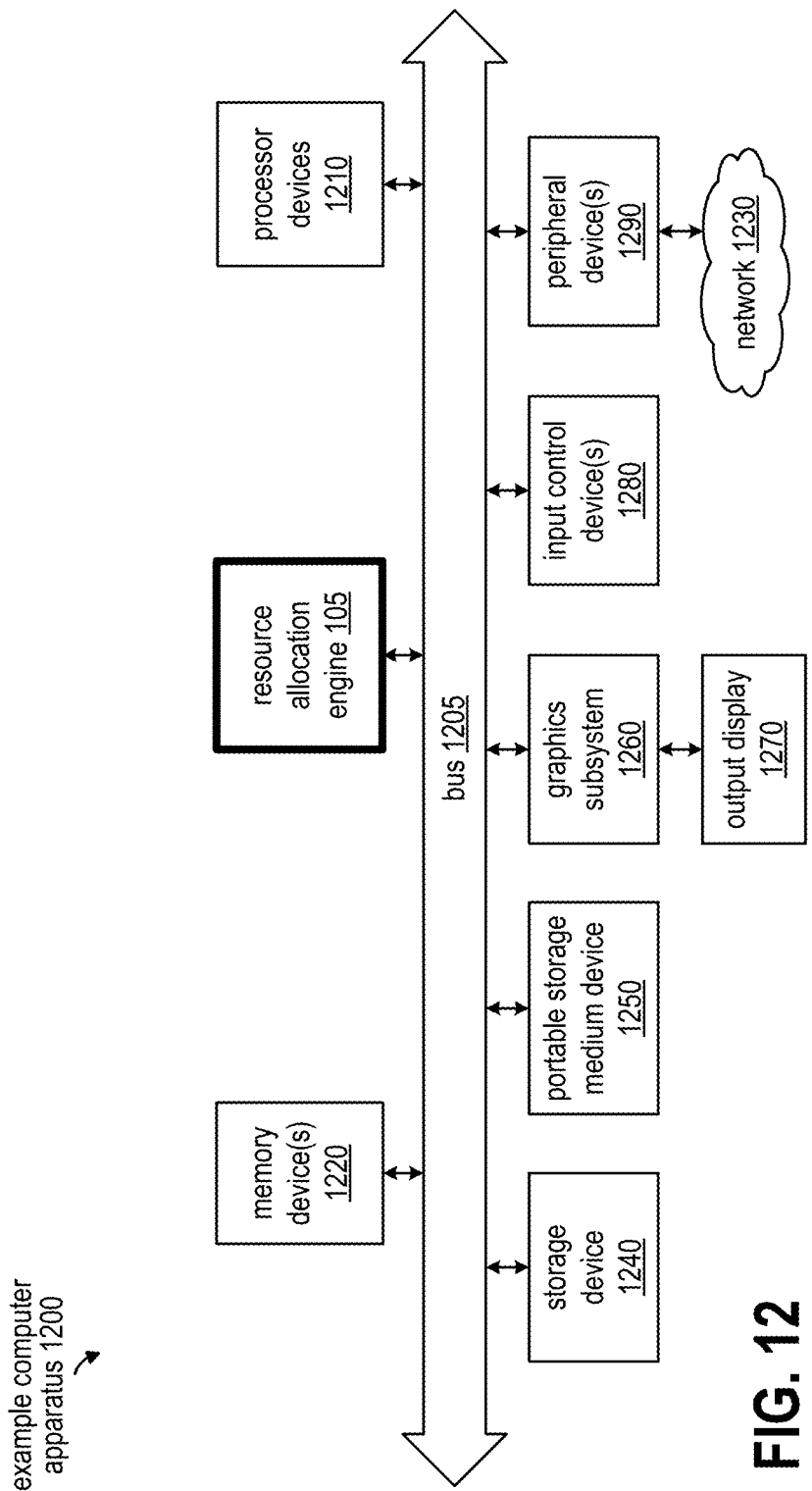
FIG. 12 is a conceptual block diagram of an example computer.

Referring now to FIG. 12, a conceptual block diagram of an example computer apparatus 1200 is shown. The computer apparatus 1200 may be, for example, a computer server, a user device, a user computer, and/or a client computer, among other things. The computer apparatus 1200 preferably includes, without limitation, the resource allocation engine 105, a plurality of processor devices 1210, one or more memory devices 1220, and an interconnect bus 1205. The processor devices 1210 may include without limitation a single microprocessor, or may include without limitation a plurality of microprocessors for configuring the computer apparatus 1200 as a multi-processor system. The memory device 1220 stores, among other things, instructions and/or data for execution by the processor devices 1210. If the system is partially implemented in software, the memory device 1220 stores the executable code when in operation. The memory device 1220 may include banks of dynamic random access memory (DRAM), as well as cache memory.

The computer apparatus 1200 may further include a storage device 1240, peripheral device(s) 1290, portable storage medium device(s) 1250, input control device(s) 1280, a graphics subsystem 1260, and/or an output display 1270. For explanatory purposes, all components in the computer apparatus 1200 are shown in FIG. 12 as being coupled via the bus 1205. However, the computer apparatus 1200 is not so limited.

Devices of the computer apparatus 1200 may be coupled through one or more data transport means. For example, the processor devices 1210 and/or the memory device 1220 may be coupled via a local microprocessor bus. The storage device 1240, peripheral device(s) 1290, portable storage medium device(s) 1250, and/or graphics subsystem 1260 may be coupled via one or more input/output (input/output) buses. The storage device 1240 is preferably a nonvolatile storage device for storing data and/or instructions for use by the processor devices 1210. The storage device 1240, which may be implemented, for example, with a magnetic disk drive or an optical disk drive. In a software embodiment, the storage device 1240 is preferably configured for loading contents of the storage device 1240 into the memory device 1220.

The portable storage medium device 1250 operates in conjunction with a nonvolatile portable storage medium, such as, for example, a compact disc read only memory (CD ROM), to input and output data and code to and from the computer apparatus 1200. In some embodiments, the software for generating a synthetic table of contents is stored on a portable storage medium, and is inputted into the computer apparatus 1200 via the portable storage medium device 1250. The peripheral device(s) 1290 may include any type of computer support device, such as, for example, an input/output (input/output) interface configured to add additional functionality to the computer apparatus 1200. For example, the peripheral device(s) 1290 may include a network interface card for interfacing the computer apparatus 1200 with a network 1230, which may include the Internet, a personal area network, a local area network, a wide area network, a mobile network, and/or a cellular network.

The input control device(s) 1280 provide a portion of the user interface for a user of the computer apparatus 1200. The input control device(s) 1280 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer apparatus 1200 preferably includes the graphics subsystem 1260 and the output display 1270. The output display 1270 may include a cathode ray tube (CRT) display and/or a liquid crystal display (LCD). The graphics subsystem 1260 receives textual and graphical information, and processes the information for output to the output display 1270.

Each component of the computer apparatus 1200 may represent a broad category of a computer component of a general and/or special purpose computer. Components of the computer apparatus 1200 are not limited to the specific implementations provided here. Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments are implemented by the preparation of application-specific integrated circuits and/or by coupling an appropriate network of conventional component circuits.

Some embodiments include a computer program product. The computer program product may be a non-transitory computer-readable storage medium and/or media having instructions stored thereon and/or therein which can be used to control, or cause, a computer to perform any of the processes of the invention. The storage medium may include without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nano-systems, molecular memory integrated circuit, RAID, remote data storage/archive/warehousing, and/or any other type of device suitable for storing instructions and/or data.

Stored on any one of the computer-readable medium and/or media, some implementations include software for controlling both the hardware of the general and/or special computer or microprocessor, and for enabling the computer and/or microprocessor to interact with a human user and/or another mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above. The processes described above may include without limitation the operations described with reference to FIGS. 1 through 11.

Conclusion

The present technology performs atomic resource allocation in a singular entity, referred to as a resource allocation engine (RAE). The RAE uses transaction based atomic allocation and release of global common resources.

The RAE has several advantages. The RAE eliminates resource allocation deadlocks. The RAE eliminates the need for different mutual exclusion object (mutex) protections for each resource type. The RAE offloads resource allocation and frees tasks from CPUs so that CPUs do not spin cycles to check on the availability of resources. The RAE autonomously ensures fairness in allocating resources at a single location (e.g., at the RAE). The RAE reduces software complexity of the system.

It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practiced by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process, or method exhibits differences from one or more of the above-described exemplary embodiments does not mean that the product or process is outside the scope (literal scope and/or other legally-recognized scope) of the following claims.

What is claimed is:

1. A method, carried out by a resource allocation engine, for allocating one or more resources for a plurality of processors, the method comprising:
   counting available units for each of the one or more resources;
   parsing a multi-resource ticket (MRT) for a processor, wherein the parsing identifies one or more requested resource types, each resource type being paired with one or more requested resource units;
   comparing the multi-resource ticket to one or more resource queues for the requested resource types, wherein the comparing determines an availability status of at least one the requested resource types; and
   based on the availability status, calculating whether or not all of the requested resource types can be allocated for the processor, wherein the calculating is completed before allocating a next requested resource for a next processor wherein the calculating further includes determining all of the requested resource types can be allocated for the processor; and
   allocating the requested resource types for the processor before allocating a next requested resource for a next processor wherein the allocating comprises:
   pushing a pointer from a resource queue to the multi-resource ticket and then sending the multi-resource ticket to an allocation queue for the processor, wherein the allocation queue is a first-in-first-out;
   executing, with the processor, the multi-resource ticket from the allocation queue.

2. The method of claim 1, further comprising:
   after the allocating, notifying the processor that the requested resources types are allocated for the processor.

3. The method of 1, further comprising:
   receiving, from the processor, an updated multi-resource ticket having an operation code set to free, indicating the one or more requested resource types are free from allocation.

4. The method of claim 1, further comprising:
   wherein the calculating further includes determining at least one of the requested resource types cannot be allocated for the processor; and
   pushing a pointer for the multi-resource ticket to a retry queue before allocating a next requested resource for a next processor, wherein the retry queue is a first-in-first-out (FIFO) queue.

5. The method of claim 1, further comprising:
   processing MRTs in a retry queue according to at least one of:
   a maximum utilization of resources that are available to the resource allocation engine;
   a quality of service (QoS) having a strict order of incoming requests to the resource allocation engine; or
   a more precisely calculated combination of the maximum utilization and the quality of service.

6. The method of claim 1, wherein each available resource unit is associated with a unique pointer in the resource queue.

7. The method of claim 6, wherein counting the available resource units further comprises:
   counting a number of unique pointers in the resource queue.

8. The method of claim 1, wherein the multi-resource ticket is associated with a unique pointer in a request queue that includes pointers for a plurality of multi-resource tickets, and wherein the request queue is a first-in-first-out (FIFO) queue.

9. The method of claim 1, wherein the multi-resource ticket is a data structure of data fields, comprising at least one of:
   an identifier for the multi-resource ticket;
   a callback address;
   an operation code;
   the requested resource type; or
   the requested resource units.

10. A resource allocation engine (RAE) for allocating one or more resources for a plurality of processors, the resource allocation engine comprising:
    a processor to execute instructions; and
    a memory device coupled to the processor, the memory device storing instructions for execution by the processor to cause the processor to perform:
    counting available units for each of the one or more resources;
    parsing a multi-resource ticket (MRT) for a processor, wherein the parsing identifies one or more requested resource types, each resource type being paired with one or more requested resource units;
    comparing the multi-resource ticket to one or more resource queues for the requested resource types, wherein the comparing determines an availability status of at least one the requested resource types; and
    based on the availability status, calculating whether or not all of the requested resource types can be allocated for the processor, wherein the calculating is completed before allocating a next requested resource for a next processor;
    allocating the requested resource types for the processor before allocating a next requested resource for a next processor wherein the allocating comprises:
    pushing a pointer from a resource queue to the multi-resource ticket and then sending the multi-resource ticket to an allocation queue for the processor, wherein the allocation queue is a first-in-first-out (FIFO) queue;
    executing, with the processor, the multi-resource ticket from the allocation queue.

11. The resource allocation engine of claim 10, wherein the instructions further cause the processor to perform:
    wherein the calculating further includes determining all of the requested resource types can be allocated for the processor; and allocating the requested resource types for the processor before allocating a next requested resource for a next processor.

12. The resource allocation engine of claim 11, wherein the allocating comprises:
   pushing a pointer for the multi-resource ticket to an allocation queue for the processor, wherein the allocation queue is a first-in-first-out (FIFO) queue.

13. The resource allocation engine of claim 11, wherein the instructions further cause the processor to perform:
   after the allocating, notifying the processor that the requested resources types are allocated for the processor.

14. The resource allocation engine of claim 11, wherein the instructions further cause the processor to perform:
   receiving, from the processor, an updated multi-resource ticket having an operation code set to free, indicating the one or more requested resource types are free from allocation.

15. A computer-readable product for allocating one or more resources for a plurality of processors, the computer-readable product including a non-transitory computer-readable storage medium storing instructions that when executed perform the functions comprising:
   counting available units for each of the one or more resources;
   parsing a multi-resource ticket (MRT) for a processor, wherein the parsing identifies one or more requested resource types, each resource type being paired with one or more requested resource units;
   comparing the multi-resource ticket to one or more resource queues for the requested resource types, wherein the comparing determines an availability status of at least one the requested resource types; and
   based on the availability status, calculating whether or not all of the requested resource types can be allocated for the processor, wherein the calculating is completed before allocating a next requested resource for a next processor wherein the functions further comprise:
   wherein the calculating further includes determining all of the requested resource types can be allocated for the processor; and
   allocating the requested resource types for the processor before allocating the next requested resource for the next processor wherein the allocating comprises:
   pushing a pointer from a resource queue to the multi-resource ticket and then sending the multi-resource ticket to an allocation queue for the processor, wherein the allocation queue is a first-in-first-out (FIFO) queue;
   executing, with the processor, the multi-resource ticket from the allocation queue.

16. The computer-readable product of claim 15, wherein the functions further comprise:
   after the allocating, notifying the processor that the requested resources types are allocated for the processor.

17. The computer-readable product of claim 15, wherein the functions further comprise:
   receiving, from the processor, an updated multi-resource ticket having an operation code set to free, indicating the one or more requested resource types are free from allocation.

* * * * *